United States Patent [19]

Osche et al.

[11] 4,155,052

[45] May 15, 1979

[54] WIRE ELECTRODE TEA LASER

[75] Inventors: Gregory R. Osche; Henry E. Sonntag, both of Ocean, N.J.

[73] Assignee: The United States of America as represented by the Secretary of the Army, Washington, D.C.

[21] Appl. No.: 737,253

[22] Filed: Nov. 1, 1976

[51] Int. Cl.² .................................... H01S 3/097
[52] U.S. Cl. .................. 331/94.5 PE; 331/94.5 D; 331/94.5 G
[58] Field of Search ............... 331/94.5 G, 94.5 PE; 313/220, 93

[56] References Cited

U.S. PATENT DOCUMENTS

| | | | |
|---|---|---|---|
| 3,617,804 | 11/1971 | Paine et al. | 331/94.5 PE |
| 3,818,375 | 6/1974 | Stapleton et al. | 331/94.5 PE |
| 3,828,277 | 8/1974 | Otto et al. | 331/94.5 PE |

OTHER PUBLICATIONS

Stark et al., *IEEE Journal of Quantum Electronics*, vol. QE-11, No. 9, pp. 774–778, Sep. 1975.

*Primary Examiner*—William L. Sikes
*Attorney, Agent, or Firm*—Nathan Edelberg; Sheldon Kanars; Bernard Franz

[57] ABSTRACT

A means for producing uniform discharges in carbon dioxide ($CO_2$) transversely excited atmospheric (TEA) lasers by the utilization of a fine wire as the central (cathode) electrode coaxially disposed in a cylindrical outer (anode) electrode having a diameter selectively chosen to provide a large ratio of outer to inner electrode radii which as a consequence produces a radial gain profile which is well localized in the center of the discharge tube and accordingly allows for efficient matching of low order stable optical modes to the active gain region while providing a high degree of mode selectivity in favor of these modes.

14 Claims, 4 Drawing Figures

WIRE ELECTRODE TEA LASER

The invention described herein may be manufactured and used by or for the Government for governmental purposes without the payment of any royalties thereon or therefor.

BACKGROUND OF THE INVENTION

This invention relates generally to the field of molecular gas lasers and more particularly to electrode structures for transversely exciting a molecular gas laser.

Carbon dioxide transversely excited atmospheric (TEA) lasers are well known. Such apparatus, for example, is described in a publication entitled "High Peak Power Gas Lasers", by Jacques A Beaulieu, which appeared in the proceedings IEEE, April, 1971, at pages 667–674, inclusive. In general, lasing action is accomplished by initiating a transverse pulsed glow discharge between longitudinally extending electrode structures whereby the desired population inversions are generated in the energy levels of a molecular laser gas contained within the laser cavity to cause laser operation. Furthermore, electrical discharges in conventional flat continuous electrode TEA lasers usually require preionization of the gas volume in order to ensure a uniform discharge. Such techniques typically require ultra violet sources or high voltage triggering circuits. The latter technique, which is most common, necessitates a delicate balance of electrode separation and trigger wire position for the system to operate properly. Pin electrodes have also been used but suffer from the disadvantage of complexity of design and a quasi-uniform or filamentary discharge structure depending upon the particular pin density and geometry. Cylindrical coaxial TEA laser systems are also well known in the art, typical examples of which are disclosed in U.S. Pat. No. 3,828,277, U.S. Pat. No. 3,898,586, and U.S. Pat. No. 3,936,767.

Accordingly, it is an object of the present invention to provide an improved coaxial cylindrical symmetric electrode configuration for a carbon dioxide transversely excited atmospheric laser which allows for better utilization of the active gain region, establishment of a uniform discharge, potentially better mode and beam control, and a simpler and more economical structure which provides reliable arc free operation for a minimum of electrode preparation.

SUMMARY

Briefly, the present invention is directed to the electrode configuration of a coaxial gas TEA laser wherein the improvement comprises a highly stressed central electrode which may be, for example, a tungsten wire having a diameter on the order of 0.01 centimeters centrally located along the longitudinal axis of a cylindrical outer electrode in the form of a metallic tube having an inside diameter of approximately 1.5 centimeters whereby the resultant large ratio of the outer to inner electrode radii ($\sim 100:1$) produces a radial gain profile which is well localized in the center of the discharge tube. The resultant active gain region is then easily matched to the mode volumes of low order stable optical modes. Furthermore, the highly stressed central electrode has the property of preionizing the gas during the early portions of the voltage pulse, thereby automatically preparing the medium for the main discharge.

DESCRIPTION OF THE PREFERRED EMBODIMENT

In contrast to current efforts to scale $CO_2$ transversely excited atmospheric (TEA) lasers to larger active volumes, certain applications both military and commercial require simple compact devices of a smaller size or scale. Output energies on the order of 50–100 milli-Jouls (mJ) are usually sought with active volumes on the order of 10–20 $cm^3$ of laser gas medium. Attempts to scale down double discharge flat electrode configurations or pin electrode structures having rectangular apertures are usually confronted with the problem of matching the more common circularly symmetrical optical modes to the rectangular active area. This mismatch limits single mode electrical efficiency to values considerably lower than the corresponding multimode values. In addition, it is observed that arcing problems become more pronounced for small scale TEA discharges. This is attributable at least in part to the proportionate increase of field gradients associated with small electrodes which are fabricated to the same tolerances as larger electrodes.

Figure 1:
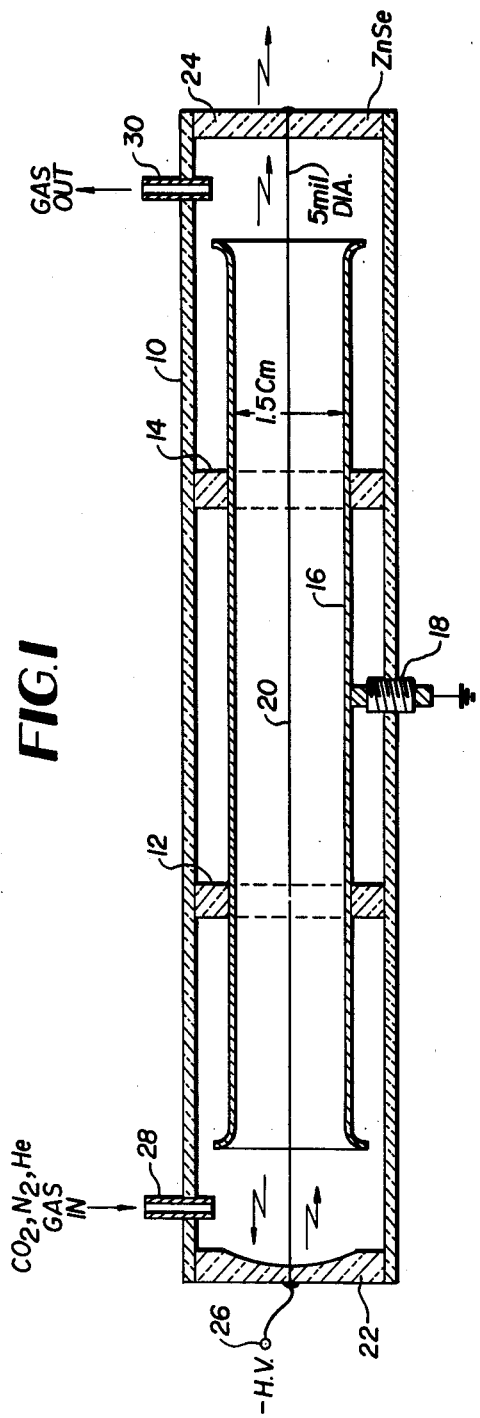
FIG. 1 is a central longitudinal cross sectional view of the preferred embodiment of the subject invention.

Referring now to the subject invention, reference is now made to FIG. 1, wherein there is disclosed a cylindrical electrode configuration for a relatively low energy TEA laser which utilizes a small diameter wire as a central electrode as opposed to the heretofore relatively large diameter rods which necessarily operate in high order transverse modes unless special toric cavities are employed and which require preionization circuitry similar to those of planar electrode geometries. More particularly, reference numeral 10 designates an outer cylindrical housing, typically 48.26 cm in length, of non-conductive material consisting of the material sold under the trademark PLEXIGLASS or some such other equivalent material, for example, glass or the like. This housing serves as a container of ballast gas which may or may not be required depending on the application. Within the housing 10 and intermediate the ends thereof, there is located a pair of annular non-conductive members 12 and 14, which are adapted to support the outer electrode or anode 16 which comprises a stainless steel tube having flared ends and an inside diameter on the order of 1.5 centimeters. In an actual tested embodiment of the subject invention, a 1.524 cm i.d. stainless steel tube was utilized. Flaring of the ends is effective in reducing field gradients near the edges thereof. A metal threaded stud 18 passes through the wall of the plexiglass housing 10 to contact the anode electrode 16 and is adapted to be grounded through the stud 18. A coaxial cathode electrode 20 in the form of a relatively small diameter tungsten wire is supported by optical cavity mirrors 22 and 24 the first of which is 100% reflective, while the second is a partially reflective ZnSe output mirror. The tungsten wire has a diameter on the order of 0.01 cm and in an actual embodiment was formed from a 5 mil diameter wire which corresponds to 0.0127 cm. Thus a diameter ratio on the order of 150/1 is provided, which results in a "highly stressed" central electrode when a negative high voltage is applied to, for example, a terminal 26 attached to the end of the cathode wire terminating in the cavity mirror 22. The laser structure additionally includes a gas inlet port 28 and a gas outlet port 30, whereupon a laser gas medium comprising, for example, a 1:1:3 mixture of carbon dioxide ($CO_2$), nitrogen ($N_2$), and helium (He) can be supplied to the housing 10 over a wide range of gas pressures typically from atmospheric pressure up to 2.5 atmospheres. Stable discharges are adapted to be obtained for applied voltage pulses between the terminal 26 and the grounded stud 18 ranging from 5 to 25 kilovolts.

Figure 2:
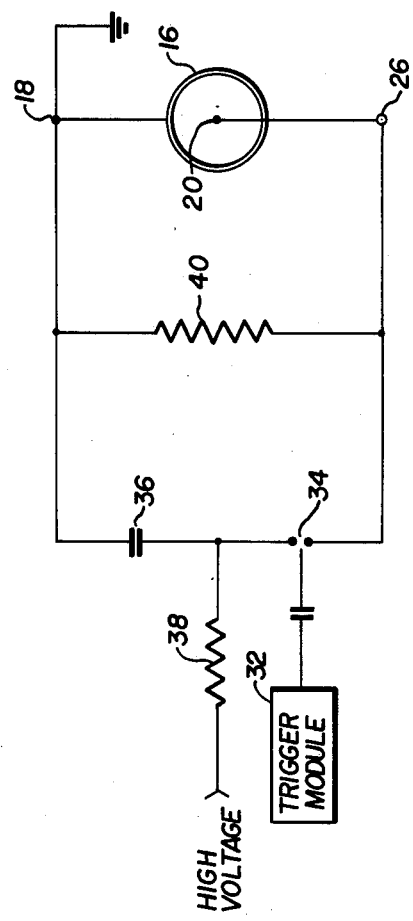
FIG. 2 is an electrical schematic diagram of a pulse forming network for triggering the embodiment of the subject invention shown in FIG. 1.

Pulsed TEA discharges are produced in the apparatus shown in FIG. 1 by means of a pulse forming network shown in FIG. 2 and which includes a trigger module 32 which produces trigger pulses which are capacitively coupled to a spark gap 34. The spark gap is series connected across the electrodes 16 and 20 by means of a capacitor 36 which is adapted to be charged to a negative high voltage from a source, not shown, through a resistor 38. When a trigger pulse is applied to the spark gap 34 it breaks down and discharges the capacitor 36 through the gaseous laser medium existing between the electrodes 16 and 20. A current limiting resistor 40 is additionally placed across the laser electrodes 16 and 20 between the capacitor 36 and the spark gap 34.

Figure 3:
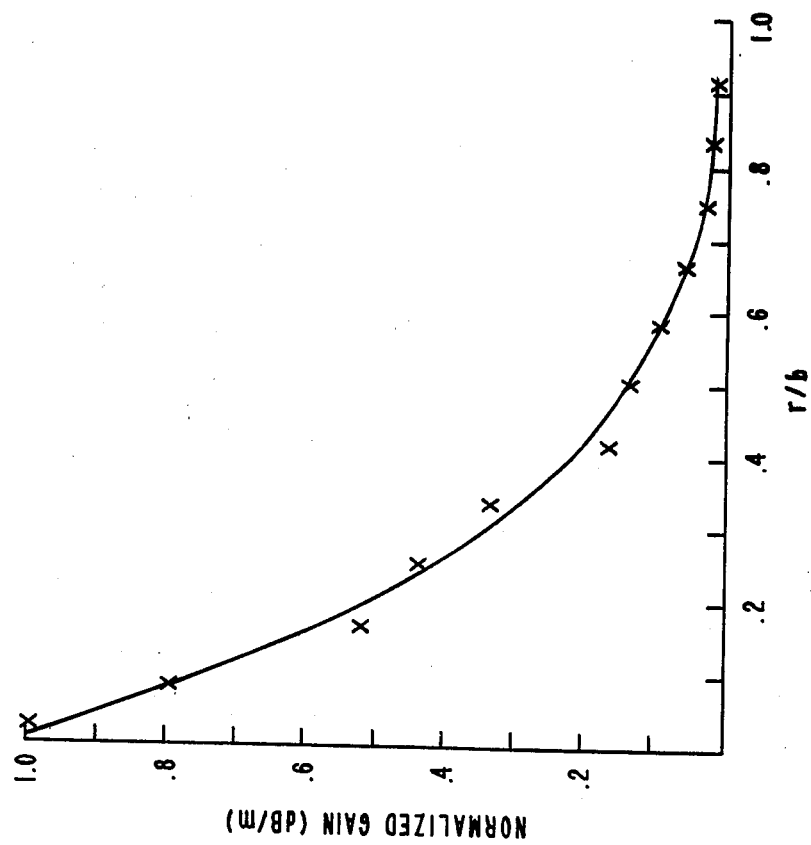
FIG. 3 is a normalized gain characteristic curve helpful in understanding the operation of the subject invention.

A highly stressed central electrode provides the desirable property of preionizing the gaseous medium during the early portions of the voltage pulse, thereby automatically preparing the medium for a uniform discharge. In addition, the electric field inside of a coaxial line falls as the inverse of the radial distance, i.e. $r^{-1}$, while the current density has a similar radial dependence for currents uniformly traversing the interelectrode gap. As a consequence, the electrical energy deposited in the plasma, obtained as the product of current density times the electric field, has an $r^{-2}$ dependence which in turn produces a strong radial gain profile. This characteristic is exhibited by the curve shown in FIG. 3, wherein normalized gain is plotted for the ratio of r/b where r is equal to the radial distance outward from the central axis of the electrode structure, and b is the inside radius of the tubular anode electrode 16. The curve indicates a radial gain profile which is well localized in the center of the discharge tube, which allows for efficient matching of low order stable optical modes in the active gain region while providing a high degree of mode selectivity. Operation in a low order $TEM_{01}$ Laguarre-gaussian mode is readily obtainable. Furthermore, the divergent nature of the electric field and current density between the electrodes makes the device particularly insensitive to arcing. As a result, operation may be obtained over a wide range of voltages, pressures and gas mixtures.

Figure 4:
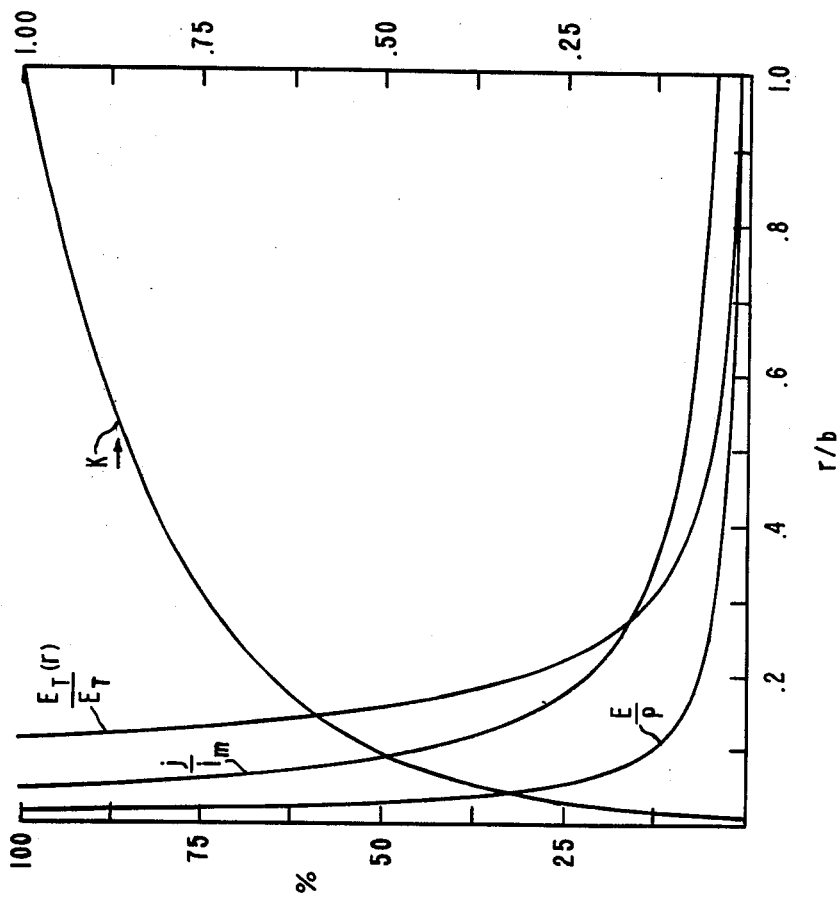
FIG. 4 is a drawing including a set of curves further helpful in understanding the subject invention.

For a further understanding of the radial gain profile, the curves shown in FIG. 4 may be resorted to where there is shown the radial dependence of the parameters E/P which is the ratio of the electric field to gaseous pressure, $j/i_m$, which is the normalized current density, $E_T(r)/E_T$ which is the normalized energy and K which is the integral of the energy disposition in the tube. From these curves it is evident that the electric field grade and current density is concentrated near the inner electrode 20, which due to its relative size, is adapted to sustain laser action heretofore unavailable. Additionally, one sees that as a consequence approximately 85% of the available electrical energy K is deposited within r/b=0.5 or within one quarter of the total gas volume. By comparison, the gain falls off by approximately 85% within this same radius, so that the point r/b=0.5 becomes a meaningful boundary for characterizing the extent of the usable gain region.

Thus what has been shown and described is a TEA electrode geometry which due to the divergent nature of the current density results in relatively high values of volumetric energy deposition in a localized region of the discharge without excessively loading the entire plasma to the point of arcing while at the same time providing a high degree of mode selectivity in favor of low order stable optical modes. The device is simple in construction and is adapted to provide maintenance free operation.

Having thus described what is at present considered to be the preferred embodiment of the subject invention,

We claim:

1. In a transversely excited atmospheric gas laser excited for pulsed discharging by a high voltage pulse forming network, and having a housing adapted to envelope a laser medium and to support a coaxial electrode structure and a pair of optical cavity mirror elements, the improvement comprising:

an outer anode electrode consisting of a metallic tubular member of a predetermined inner diameter; and an inner cathode electrode consisting of a length of electrical conductor having an outer diameter which is extremely small relative to the inner diameter of said outer electrode coaxially aligned within said outer electrode and wherein the ratio of the outer to inner electrode diameters is selectively large to produce a radial gain profile which is substantially localized in the vicinity of the inner electrode; so that the inner cathode electrode is highly stressed when a negative polarity voltage from the high voltage pulse forming network is applied thereto, and the inner cathode electrode also functions as a preionizing electrode so that a uniform discharge is obtained without arcing.

2. The laser as defined by claim 1 wherein said laser medium consists of a gas mixture of carbon dioxide, nitrogen and helium.

3. The laser as defined by claim 1 wherein said inner electrode consists of a length of metal conductor and wherein the ratio of the outer to inner electrode diameters is in the order of at least 100:1.

4. The laser as defined by claim 1 wherein said inner electrode consists of a length of conductor having a diameter in the order of 0.01 cm, and said outer electrode consists of a tubular member having an inner diameter on the order of 1.5 cm and a length less than 100 cm.

5. The laser as defined by claim 4 wherein the inner electrode consists of a length of tungsten wire coupled to said high voltage pulse forming network and wherein said outer electrode is connected to ground for safety.

6. The laser as defined by claim 5 wherein said inner electrode is supported between said pair of optical cavity mirror elements and said outer electrode has flared ends to reduce field gradients near the edges thereof.

7. The laser as defined by claim 6 wherein the length of the outer (anode) electrode is less than the length of the inner (cathode) electrode.

8. The laser as defined by claim 7 wherein the housing consists of a tubular structure of predetermined diameter and additionally including annular support means located interiorly thereof for supporting said outer electrode.

9. The laser as defined by claim 8 wherein said pair of optical cavity mirror elements are located at opposite ends of said housing.

10. The laser as defined by claim 1, wherein said outer anode electrode and said inner cathode electrode are substantially smooth surfaces and are the only electrodes within the laser, said laser medium fills the space between the inner and outer electrodes.

11. The laser as defined by claim 10, wherein the pressure of the laser medium is in the range from nearly atmospheric to 2.5 atmospheres.

12. The laser as defined on claim 11, wherein said modes include the $TEM_{01}$ Laguarre-Gaussian mode.

13. The laser as defined by claim 10, wherein said inner cathode electrode constitutes a very small obstruction within the cavity so that operation at low order transverse optical modes is obtained depending on the voltage and alignment of the inner electrode.

14. The laser as defined by claim 10, wherein said high voltage pulse forming network includes a spark gap which is triggered in series with said inner cathode and outer anode electrodes.

* * * * *